Patented May 30, 1933

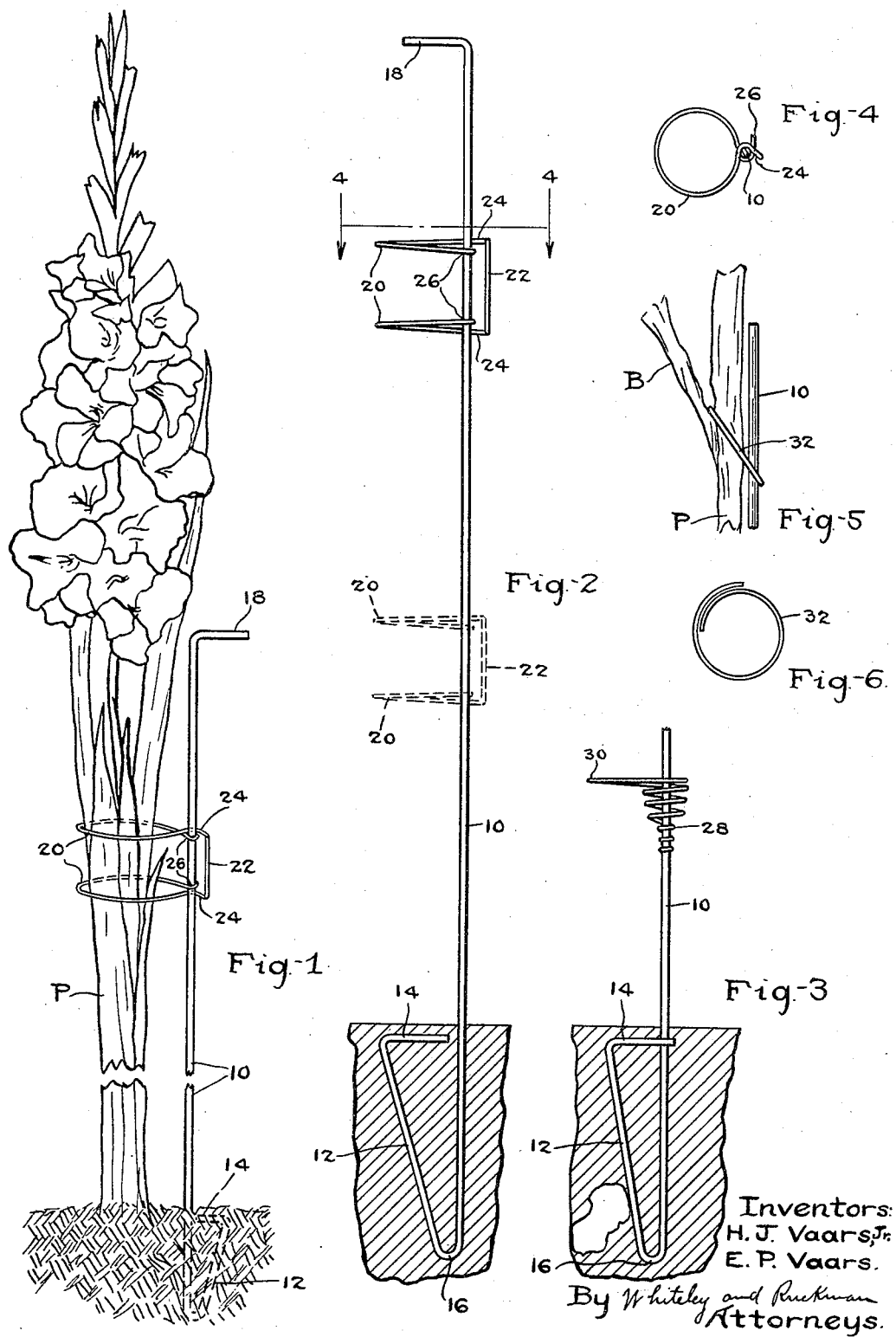

1,911,979

UNITED STATES PATENT OFFICE

HENRY J. VAARS, JR. AND EUGENE P. VAARS, OF ROBBINSDALE, MINNESOTA

PLANT SUPPORT

Application filed May 11, 1932. Serial No. 610,577.

Our invention relates to plant supports. An object of the invention is to provide a device of this character consisting of a standard having an enlarged member on its lower end for firmly holding said end in the ground. Another object is to provide a device of this character having a member extending at substantially a right angle to the standard above the lower end thereof adapted for engagement by the foot to force the standard into the ground. Another object is to provide a device of this character in which the standard has a rounded member on its lower end to prevent piercing of bulbs and roots when the standard is forced into the ground. Another object is to provide a device of this character in which the upper end of the standard is offset or enlarged to prevent injury to persons who bend over the plant supported by the device. Another object is to provide a device of this character which carries a suitable loop device for encircling the plant which is to be supported. Another object is to provide a loop device which permits the plant to turn with the wind so as to be less liable to be broken down by the force of the wind.

The full objects and advantages of our invention will appear in connection with the detailed description thereof, and the novel features of the inventive idea will be particularly pointed out in the claims.

In the accompanying drawing, which illustrates some of the forms in which our invention may be embodied,—

Fig. 1 is an elevational view showing a plant supported by one form of our device. Fig. 2 is an elevational view showing in particular the manner in which the device is supported in the ground. Fig. 3 is a fragmentary view of another form of the device. Fig. 4 is a view in section on the line 4—4 of Fig. 2. Fig. 5 is a fragmentary view of still another form of the device. Fig. 6 is a plan view of the form shown in Fig. 5.

Referring to the drawing it will be seen that we provide a metal rod having a body member 10 which constitutes a standard. One end of the rod is bent approximately in the form of a triangle having an inclined side 12 and an upper side 14, the third side of the triangle being constituted by the lower portion of the body member 10. The member 14 extends at substantially a right angle to the body member 10, while the inclined member 12 diverges from the lower end of the body member 10, the apex 16 where it joins therewith being rounded for a purpose which will be referred to later. The upper end of the rod is bent to form a short member 18 which extends at substantially a right angle from the body member 10 and constitutes an enlarged or offset portion.

Figs. 1, 2 and 4 show one form of loop device for encircling the plant P which is to be supported. The end portions of a piece of wire are bent to form two loop members 20 which extend out from the middle portion 22 of the wire. The loop members 20 are so bent from the middle member 22 as to form re-entrant connecting members 24 adapted to engage one side of the standard 10. The free ends of the loop members 20 are formed with hooks 26 adapted to engage the opposite side of the standard 10. This loop device is readily attached to the standard by placing the re-entrant members 24 in engagement with the standard and then snapping the hooks 26 into engagement with the opposite side thereof. This operation will be readily understood from Figs. 1 and 4. It will be understood from Fig. 2 that if desired more than one of the loop devices may be employed on the standard 10 for holding the plant in place.

In the form shown in Fig. 3 one end portion of a piece of wire is bent in the form of a helical spring 28 adapted to slide frictionally on the standard 10. The other end of this wire is bent to form a loop 30 adapted to encircle the plant. This form of loop device is slid upon the standard 10 from the upper end thereof.

The form of loop device shown in Figs. 5 and 6 consists of a split ring 32. This ring has sufficient resiliency so that the end portions may be sprung apart to encircle the plant P and the standard 10. The engagement of the ring in the crotch formed by a branch B of the plant will prevent the ring from sliding down too far.

The operation and advantages of our invention will be understood in connection with the foregoing description. The formation of the standard with the triangular member shown in the drawings has a three-fold function: First, an enlargement is produced which holds the standard firmly in the ground; second, the rounded apex 16 prevents the standard from piercing bulbs and roots when the standard is forced into the ground; third, the member 14 serves as a foot rest upon which the foot may be placed to force the standard into the ground. The device is preferably formed from a metal rod of sufficient resilience to permit the plant to bend with the force of the wind, thereby lessening liability of the plant being broken down. Such liability is also lessened by the fact that the loop device is capable of turning on the standard, thereby permitting the plant to turn. Due to the fact that the loop device is slidable as well as releasably mounted, it may be raised as the plant grows, or, if desired, more than one loop device may be employed, as shown in Fig. 2. The bent-over member 18 at the upper end constitutes an enlargement which prevents possible injury to a person bending over the plant; and this member may also be grasped for pulling the standard out of the ground when the use of the device is no longer desired. The device is of a permanent character and may be used over and over, since it will not rot in the ground, as is the case with wooden supports. Furthermore, the device is sufficiently strong when of comparatively small size, and therefore, on account of being nearly invisible, does not detract from the appearance of the plant.

It will be noted from Figs. 1 and 2 that the horizontal member 14 terminates adjacent the body member 10. However, when the device is forced into the ground and the upwardly inclined member 12 strikes a stone or other obstruction, as shown in Fig. 3, the member 12 will readily yield so that the downward movement of the device into the ground is not seriously interfered with.

We claim:

1. A plant support comprising a rod forming a standard and a plant engaging device carried by said standard, said engaging device consisting of a single piece of wire having a straight middle member, loops extending at right angles from both ends of said straight member, said loops being spaced a substantial distance from each other, and hooks on the free ends of said loops for engagement with one side of said standard, said loops being joined to the ends of said straight member by re-entrant portions for engagement with the diametrically opposite side of said standard.

2. A plant support comprising a rod having a body member forming a standard, said body member being straight from top to bottom, an upwardly-inclined member bent from the lower end of said body member, and a horizontal member bent from the upper end of said inclined member and terminating adjacent said body member.

3. A plant support comprising a rod having a body member forming a standard, said body member being straight from top to bottom, an upwardly-inclined member bent from the lower end of said body member, a horizontal member bent from the upper end of said inclined member and terminating adjacent said body member, and a plant-encircling member frictionally engaging said straight body member whereby it may be adjusted up and down thereon.

In testimony whereof we hereunto affix our signatures.

HENRY J. VAARS, Jr.
EUGENE P. VAARS.